US007475537B2

(12) United States Patent
Spickard

(10) Patent No.: US 7,475,537 B2
(45) Date of Patent: Jan. 13, 2009

(54) MAINTAINING THE POSITION OF AN ELECTRO-HYDRAULIC SERVO VALVE CONTROLLED DEVICE UPON LOSS OF POSITION COMMAND

(75) Inventor: Mark A. Spickard, Rockford, IL (US)

(73) Assignee: Woodward Governor Company, Rockford, IL (US)

( * ) Notice: Subject to any disclaimer, the term of this patent is extended or adjusted under 35 U.S.C. 154(b) by 353 days.

(21) Appl. No.: 11/422,219

(22) Filed: Jun. 5, 2006

(65) Prior Publication Data

US 2007/0277670 A1 Dec. 6, 2007

(51) Int. Cl.
*F16D 31/02* (2006.01)
*F15B 13/16* (2006.01)

(52) U.S. Cl. .......................................... 60/403; 91/365

(58) Field of Classification Search .................. 60/403, 60/406, 460; 91/365, 444
See application file for complete search history.

(56) References Cited

U.S. PATENT DOCUMENTS

| | | | | |
|---|---|---|---|---|
| 3,906,727 A * | 9/1975 | Hull | ............................ | 60/403 |
| 4,276,809 A * | 7/1981 | Kast | ......................... | 91/417 R |
| 5,156,189 A * | 10/1992 | Tranovich | .............. | 137/625.68 |
| 7,296,406 B2 * | 11/2007 | Futa et al. | ..................... | 60/403 |

* cited by examiner

*Primary Examiner*—Michael Leslie
(74) *Attorney, Agent, or Firm*—Reinhart Boerner Van Deuren P.C.

(57) ABSTRACT

A valve that keeps a electro-hydraulic servo valve (EHSV) controlled device such as a fuel metering valve or actuator at the last commanded position upon loss of input command in the EHSV is described. The valve fixes the position of the positioning device within a tolerance of the position the positioning device was at prior to the loss of the position command. Upon loss of the input position command, the valve moves from its spring-biased default position to a position that keeps the positioning device at a position within a tolerance band of its last commanded position as a result of the differential pressure created when the EHSV loses its input position command

17 Claims, 6 Drawing Sheets

MAINTAINING THE POSITION OF AN ELECTRO-HYDRAULIC SERVO VALVE CONTROLLED DEVICE UPON LOSS OF POSITION COMMAND

FIELD OF THE INVENTION

This invention pertains to valves, and more particularly to valves controlled by electro-hydraulic servo valves.

BACKGROUND OF THE INVENTION

Electro-hydraulic servo valves (EHSVs) are within many position control systems. The EHSV converts a low energy signal level command from a controller into a high energy hydraulic command. This hydraulic command is used to position mechanical components. For example, fuel metering valves require that the position of the metering valve be controlled. Similarly, variable geometry vane systems require the position of a variable geometry actuator be controlled. The first stage of the servo valve is typically a double or single acting flapper valve with a torque-motor actuated flapper and the second stage is typically a spool type valve.

Upon loss of a position command to the low energy torque motor (e.g., loss of control power), the EHSV drives the device being controlled to a shut-off position due to the bias spring within the EHSV. Some end-use applications desire that the device be driven to a shut-off position. However, other applications require that the position of the device being controlled stay at the position it was at when a loss of position command occurs.

BRIEF SUMMARY OF THE INVENTION

The invention provides a valve that keeps a device that is controlled by an electro-hydraulic servo valve (EHSV) such as a fuel metering valve, or actuator, at the last commanded position upon loss of input command in the EHSV. The valve fixes the position of the device within a tolerance of the position the positioning device was at prior to the loss of the position command. Upon loss of the input position command, the valve moves from its spring-biased default position to a position that keeps the device at a position within a tolerance band of its last commanded position as a result of the differential pressure created when the EHSV loses its input position command.

The valve includes a first and second end that are in fluidic communication with the control pressure lines of the EHSV. The valve moves as a result of the pressure differential between the first and second ends created as a result of the loss of the input position command to the EHSV. The valve has a first port in fluidic communication with a control port of the device during normal operation of the electro-hydraulic servo-valve. Through this port, the EHSV provides either source pressure or drain pressure for allowing movement of the device during normal operation. Upon movement of the valve, the first port is disconnected from the control port and the device is kept within a tolerance window of a last commanded position.

In one embodiment, the valve maintains the position of a valve spool being controlled by an EHSV upon loss of the input position command of the EHSV. The valve has first and second ends in fluidic communication with the EHSV's first and second control pressure lines, respectively. The valve is biased towards the second control pressure line by a spring. The valve spool has a first control port and second control port that are used to move the valve spool. The valve has a first port that is, via a second port in fluidic communication with the first control port of the valve spool during normal operation of the EHSV. The valve has a third port that is in fluidic communication with the second port and is blocked by the valve during normal operation of the electro-hydraulic servo-valve. The valve is adapted to move as a result of the pressure differential between the first and second ends created as a result of the loss of the input position command. The valve moves to a position such that the second port is disconnected from the first port and the third port is connected to the second control pressure line, thereby causing the first control port and the second control port to be connected to the second control pressure line, thereby equalizing the pressure across the valve spool and eliminating any force on the valve spool. The valve spool has a pressure seal and the valve also has a pressure seal port that is in fluidic communication with the pressure seal. The pressure seal port is connected to the EHSV's first control pressure line (whose pressure is approaching drain pressure) by initial movement of the valve after loss of the input position command thereby creating a side-load on the valve spool. The side-load brakes any movement of the valve spool during the time it takes for the third port to be connected to the second control pressure line. The combination of the brake and elimination of the force on the valve spool fixes the valve spool in its last commanded position.

In another embodiment, the valve maintains the position of an actuator being driven by an EHSV upon loss of the EHSV's input position command. The actuator position is controlled by the pressure differential between the actuator head and the actuator rod. A control rod pressure line connected to the rod and a control head pressure line connected to the head control movement of the actuator by providing source and drain pressure controlled by a two stage electro-hydraulic servo-valve having a valve spool having a pressure head line and a pressure rod line for controlling the flow of a source pressure and a drain pressure to the control rod pressure line and the control head pressure line. The valve has first and second ends in fluidic communication with first and second control pressure lines of the EHSV, respectively. The valve has a first port, which via a second port, connects the control head pressure line to the pressure head line and a third port, which via a forth port, connects the control rod pressure line to the pressure rod line during normal operation of the EHSV. The valve is adapted to move as a result of the pressure differential between the first and second ends created upon the loss of the input position command to a position such that the first port is disconnected from the second port thus disconnecting the pressure head line and the control head pressure line and the third port is disconnected from the fourth port thus disconnecting the pressure rod line and the control rod pressure line.

The valve further has a fifth port and a sixth port with the second and fifth ports connecting the control head pressure line to one of source pressure via the first port or drain pressure via the third port and the fourth and sixth ports connecting the control rod pressure line to one of source pressure via the first port or drain pressure via the third port after the first end initially hits a stop.

The rod has a plurality of lands. Two of these lands block the first port from being in fluidic communication with the second port and the sixth port and two or more lands blocks the third port from being in fluidic communication with the fourth port and the fifth port after the first end hits a stop.

Other aspects, objectives and advantages of the invention will become more apparent from the following detailed description when taken in conjunction with the accompanying drawings.

Figure 1:
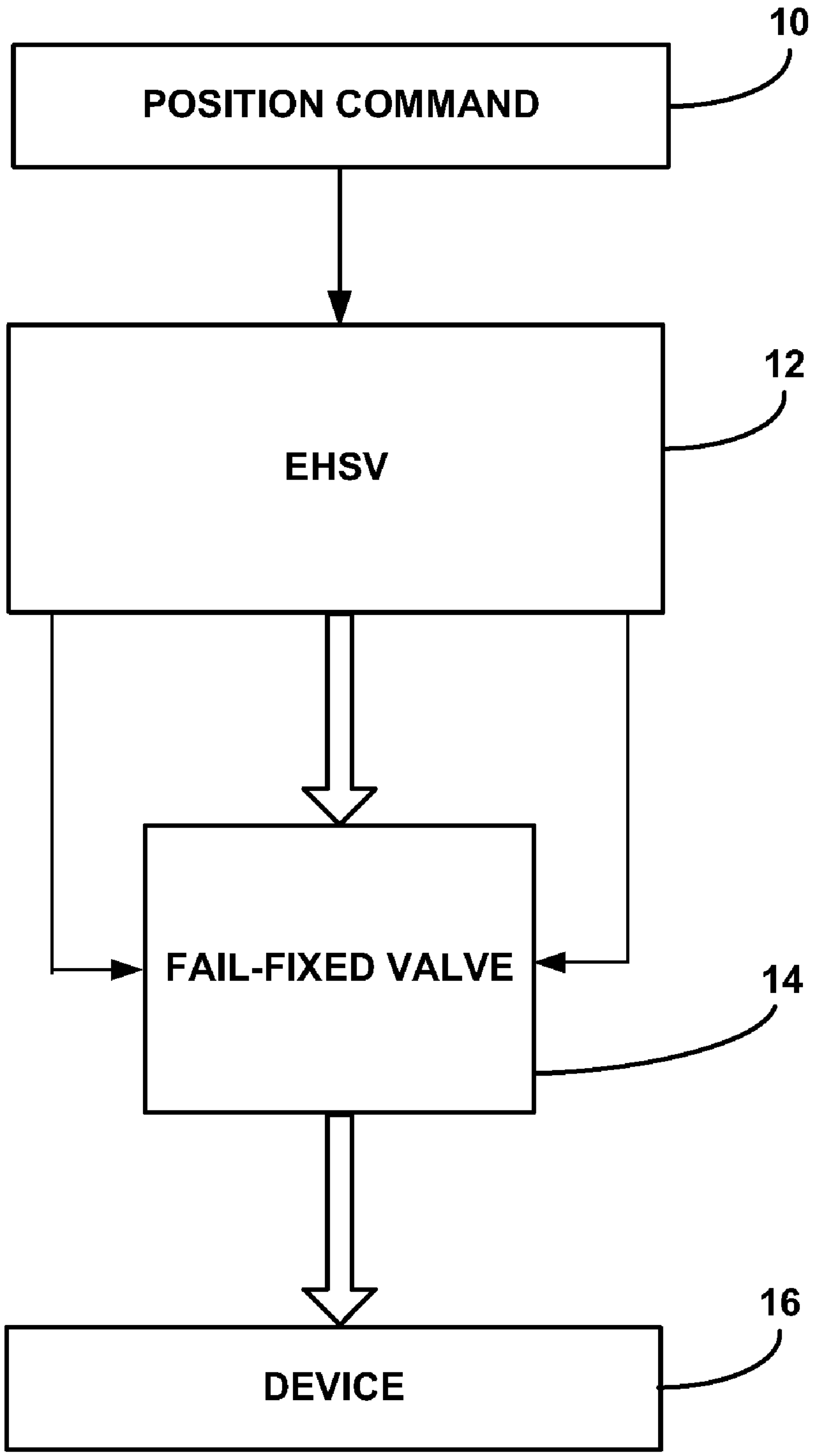
FIG. 1 is a block diagram illustrating an environment in which the present invention operates.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

The invention provides a system that keeps a device whose position is controlled by an electro-hydraulic servo valve (EHSV) at the last commanded position upon loss of input command in the EHSV. In other words, the valve fixes the position of the device within a tolerance of the position just prior to the loss of the position command. For purposes of clarity, this valve shall be called a fail-fixed valve in the discussion that follows. The invention is used in applications where it is important that the device be kept at its position that was commanded prior to the loss of the input command. The device may be any device whose position is controlled by an EHSV. Turning to the drawings, wherein like reference numerals refer to like elements, in general, the EHSV 12 is driven by an input position command 10 that typically is in the form of a mA current. Other forms of input position commands may be used. The EHSV 12 may be a single stage EHSV or a multiple-stage EHSV. The EHSV drives a device 16 to a commanded position in response to receiving an input position command 10. Upon loss of the input position command, the fail-fixed valve 14 moves from its default position to a position that keeps the device 16 within a tolerance band of its last commanded position.

In the description that follows, a fuel metering valve and a variable geometry system shall be used to describe the invention. Those skilled in the art will recognize that the orientations used to describe movement (i.e., up, down, left, right, etc.) refer to how the fuel metering valve and the variable geometry system are illustrated in the figures.

Figure 2:
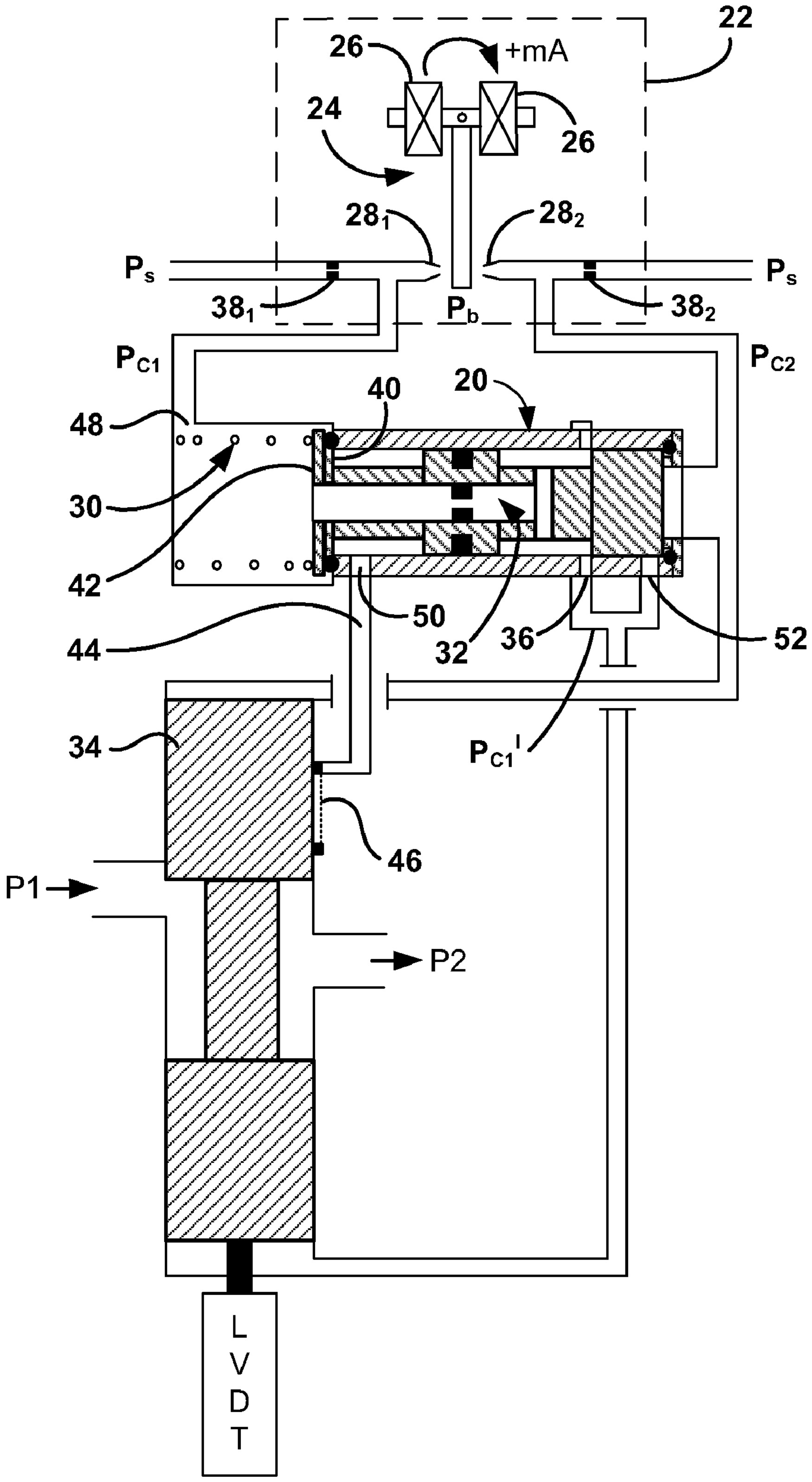
FIG. 2 is an illustration of a fuel metering valve in which the valve in accordance with the teachings of the invention interfaces with the fuel metering valve.

Turning now to FIG. 2, the fail-fixed valve 20 is illustrated in a fuel metering valve application where the position of the valve spool 34 of the fuel metering valve is maintained upon loss of the position command. The EHSV 22 is shown as a single stage device with supply pressure $P_s$ feeding both sides of the EHSV 22. During normal operation, EHSV 22 accepts a position command typically in the form of a mA current command and transforms the position command into a differential pressure $P_{c1}-P_{c2}$ via movement of the flapper 24 by a torque motor 26 (represented as windings). Typically, the flapper 24 is at the center position between nozzles 28$_1$, 28$_2$ and the $P_{c1}$ control pressure line "flows" through port 48, down around the spring 30 of the fail-fixed valve 20, through the orifice 32 and down through the $P_{c1}$' line to the bottom of the fuel metering valve 34 (i.e., the valve spool) via port 36. The orifice 32 doesn't saturate and is relatively large as compared to $P_{c1}$ flow rates. The $P_{c2}$ control pressure line "flows" down to the top of the fuel metering valve 34. During normal operation, the $P_{c1}$ and $P_{c2}$ pressures push the fuel metering valve 34 to the desired position to regulate the amount of flow from $P_1$ to $P_2$. The desired position is fed back to a controller via the LVDT (linear variable differential transformer) to be used in determining the current level that is commanded to the EHSV. While an LVDT is shown, other position sensors may be used. The spring 30 has a sufficient preload to keep the fail-fixed valve 20 from moving in the presence of the $P_{c1}-P_{c2}$ pressure differential.

Without the fail-fixed valve 20, if the EHSV 22 were to fail and the position command goes to zero, the flapper 24 would move to block the nozzle on the $P_{c2}$ side and the resulting pressure increase would cause the fuel metering valve 34 to diverge and be driven to either minimum fuel flow or maximum fuel flow (depending on how the fuel metering valve is designed).

Figure 3:
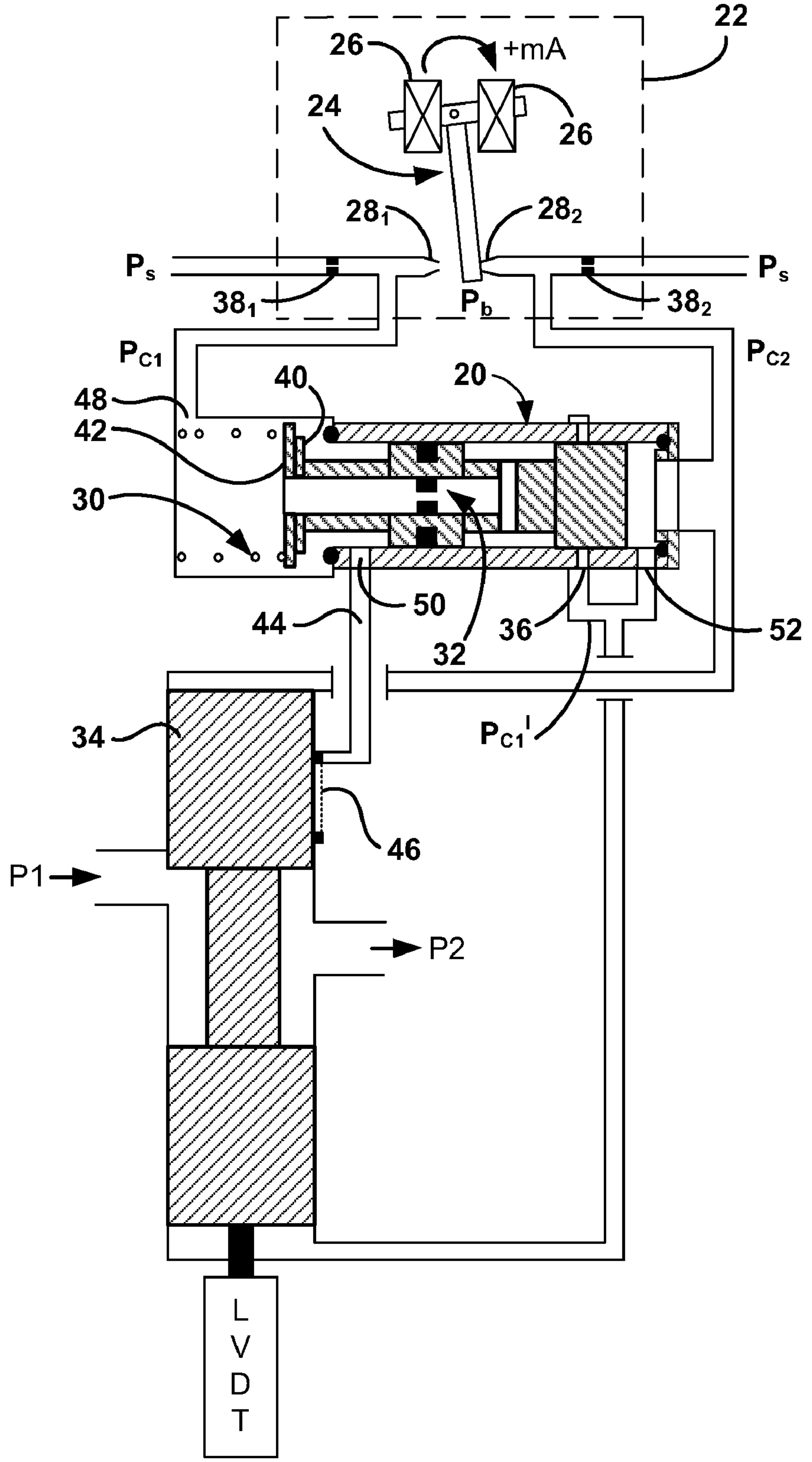
FIG. 3 is an illustration of how the valve of FIG. 2 prevents the fuel metering valve of FIG. 2 from moving upon loss of an input position command.

With the fail-fixed valve 20, the fuel metering valve 34 stays at its last commanded position when the input command to the EHSV 22 fails with a current command going to a zero value. Turning now to FIG. 3, when the EHSV current driver fails and goes to zero mA, the EHSV 22 would torque over hard and the flapper 24 would hit the nozzle 28$_2$. Normally, the flow goes from Ps through the orifice 38$_1$, 38$_2$, and then either to Pc1 or Pc2, or through a nozzle 28$_1$, 28$_2$ and through the flapper gap to $P_b$ (e.g., drain). In other words, the high pressure supply is going to either go through the orifice and go off to Pc2 or it is going to squeeze through the small flapper gap restriction and go off through low pressure.

When the current command goes to zero, the flapper 24 moves hard towards the nozzle 28$_2$, which causes the gap 28$_2$ to become quite small and allows the gap 28$_1$ to become quite large. As a result, $P_{c1}$ goes to very low pressure (i.e., approaches $P_b$) and $P_{c2}$ goes to a very high pressure (i.e. approaches $P_s$).

When $P_{c2}$ increases and $P_{c1}$ decreases, two things will occur. First, the resulting pressure differential will drive the fuel metering valve 34 downward in the orientation shown. However, at the same time, the fail-fixed valve 20 is going to start moving quickly (to the left) due to the pressure differential. Note that when the fuel metering valve 20 actually does start to move and is translating, there is flow going from the $P_{c2}$ line to the top of the fuel metering valve 34 and flow being displaced from the bottom is going through the $P_{c1}$' line. If the fuel metering valve 34 has a velocity, there is going to be a flow rate in the $P_{c1}$' line that has to go through the orifice 32 in the fail-fixed valve 20, thereby causing a pressure differential to be across the orifice 32. The pressure differential will allow $P_{c1}$ to be even lower.

As soon as the fail-fixed valve 20 begins to move to the left, the seal 40 on the spring seat 42 cracks open right away. As soon as it cracks, pressure seal line 44 that goes to pressure seal 46 and port 50 is opened to $P_{c1}$, which just went to low pressure. As a result, the pressure in the line 44 will quickly go to a low pressure. The pressure seal 46 consists of an area that is machined along one side of the fuel metering valve 34. The inlet fuel passage pressure $P_1$ and outlet fuel passage pressure $P_2$ are relatively high in comparison to the pressure in line 44 when line 44 opens to $P_{c1}$. In typical EHSV pressures, $P_{c1}$ will drop 100 psi or more below $P_1$. As a result, not much area is needed for the pressure seal to produce a sufficient side load.

If the pressure in line 44 goes low, the differential pressure between $P_1$ and $P_{c1}$ at the pressure seal creates a high sideways load on the fuel metering valve piston. The high sideways load creates a high friction on the fuel metering valve 34 and acts like a temporary brake to keep the fuel metering valve 34 from moving.

As the fail-fixed valve 20 continues to move to the left, the fail-fixed valve 20 closes the port 36, resulting in no place for the $P_{c1}$' to move. As port 36 becomes closed, port 52 opens, which connects $P_{c1}$' to $P_{c2}$, and the top and bottom of the fuel metering valve 34 are now at $P_{c2}$. As a result, the fuel metering valve 34 stops moving.

In summary, two things were completed at once. The pressure seal 46 went to low pressure to effectively put a brake on the fuel metering valve 34 and at the same time, the pressure at the top and bottom of the fuel metering valve were equalized, thereby removing the driving force. This combination stops the fuel metering valve 34 from moving. The resulting initial "shift" of the fuel metering valve is minimal and kept within a tolerance window.

In the above description, the pressure seal is effective at putting a braking function on the device to aid in keeping the device from moving. The braking function is effective because there is no mechanical load on the fuel metering valve positioning device. However, in some applications, external mechanical loads are present that can move the device and can overpower the braking function. Additionally, in some devices, equalizing the $P_{c1}$ and $P_{c2}$ pressure does not eliminate the driving force and thus does not stop the device from moving. For example, in a hydraulically driven actuator, such as that found in a variable geometry actuator system, a pressure seal will not have much of an effect due to the large external mechanical loads that are applied to the actuator. Additionally, the head area and rod area of the actuator are typically different, so even if Pc1 and Pc2 pressures are the same, there is still a hydraulic force present in the system.

Figure 4:
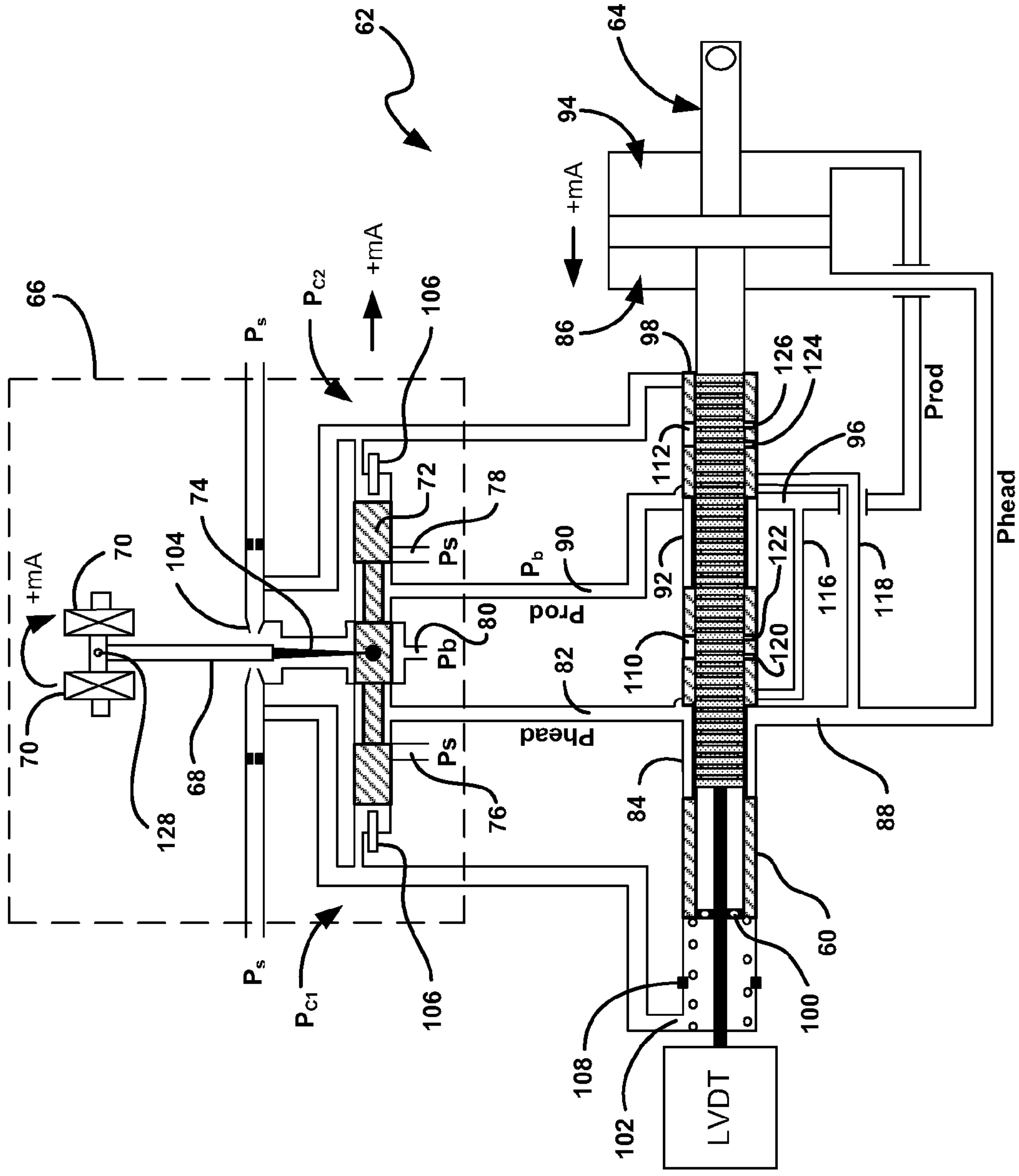
FIG. 4 is an illustration of an actuator in which the valve in accordance with the teachings of the invention interfaces with the actuator.
Figure 5:
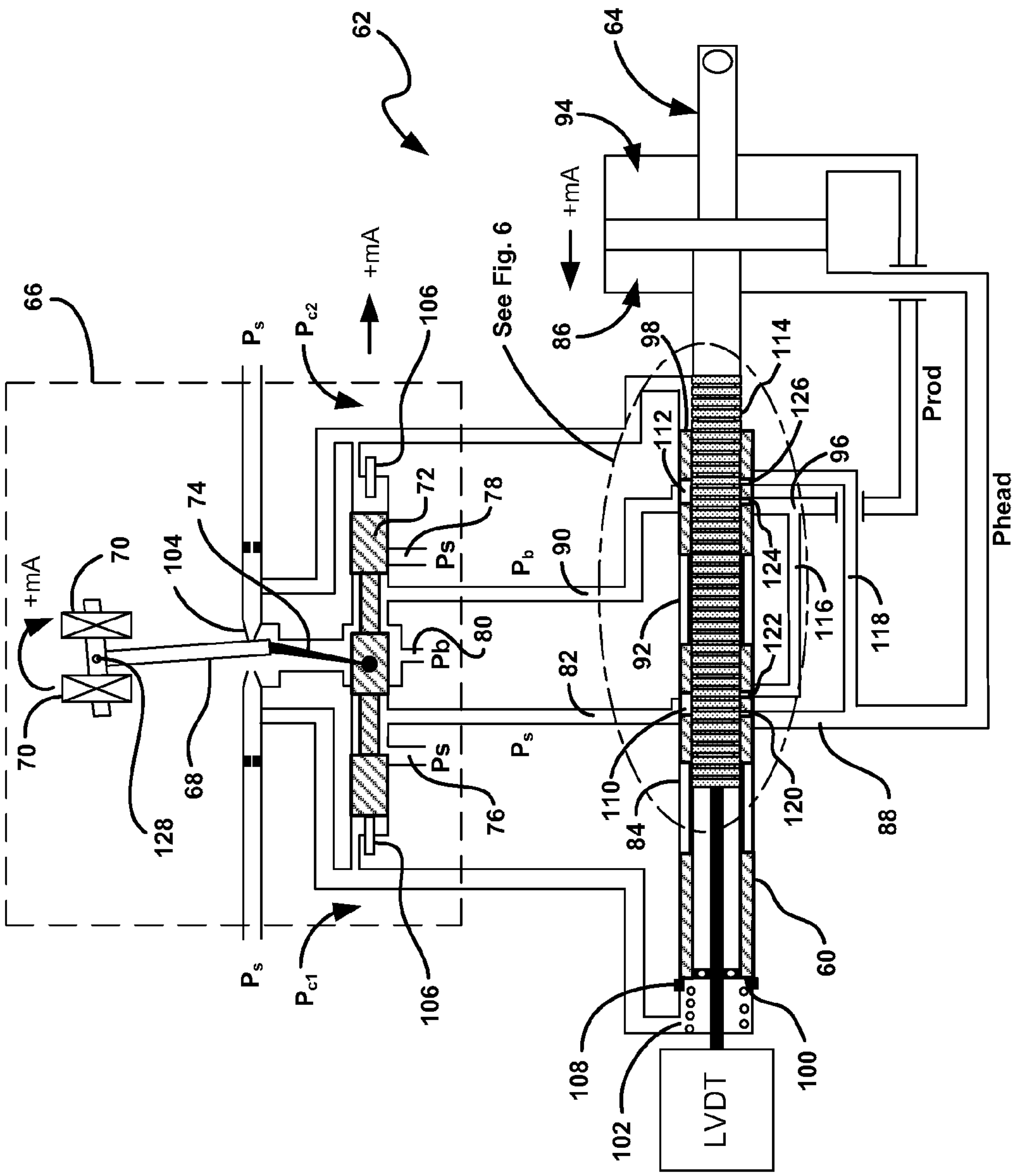
FIG. 5 is an illustration of how the valve of FIG. 4 prevents the actuator of FIG. 4 from moving upon loss of an input position command.

Turning now to FIGS. 4 and 5, a fail-fixed valve 60 is shown in an actuator system 62. In the description that follows, the stationary sleeve of the fail-fixed valve 60 is not shown for clarity. As such, the associated ports in which head line 88, rod line 96, and lines 82, 90, 116, and 118 connect are shown as the ends of the lines coming into the valve 60. For example, line 82 connects to a first port of the fail-fixed valve 60, head line 88 connects to a second port of the fail-fixed valve 60, line 90 connects to a third port of the fail-fixed valve 60, line 96 connects to a fourth port of the fail-fixed valve 60, line 118 connects to a fifth port of the fail-fixed valve 60, and line 116 connects to a sixth port of the fail-fixed valve 60. The annuluses 84, 92, 110, 112, 120, 122, 124, and 126 in the valve piston define what lines (via the ports) are connected to each other. In the description that follows, the annuluses of the fail-fixed valve 60 shall be used to describe the invention. The actuator 64 can be connected to an engine's variable geometry system. High pressures and high flow rates are needed to drive the actuator 64 against the external loads and at the required translation rate. The EHSV 66 is a two stage EHSV with the second stage valve 72 handling the high flow rates required. The flapper 68 is driven by a torque motor (represented by windings 70) and is connected to the second stage valve 72 by a leaf type "spring" 74.

The flapper 68 is stationed in the center during steady state operation. The second stage valve 72 has a $P_s$ port on the left side (port 76) and the right side (port 78) connected to supply pressure. The middle port 80 is connected to low pressure $P_b$ (i.e., drain). The EHSV 66 controls two pressures—$P_{head}$ and $P_{rod}$. During normal operation, if valve 72 is moved to the left, $P_{head}$ is connected to Ps and $P_{rod}$ is connected to $P_b$. If valve 72 is moved to the right, $P_{head}$ is connected to $P_b$ and $P_{rod}$ is connected to $P_s$.

The $P_{c1}$ and $P_{c2}$ control pressures in the EHSV 66 are used to move the second stage valve 72 back and forth. In other words, the position of the second stage valve 72 is controlled via the $P_{c1}$ and $P_{c2}$ control pressures. There is a linear relationship between the position command (e.g., input mA current command) and the second stage valve position. As the flapper 68 moves, $P_{c1}$ and $P_{c2}$ change and drive the second stage valve 72 to a position where $P_{c1}$ and $P_{c2}$ reach equilibrium. As the second stage valve 72 moves, the spring 74 connected to the flapper 68 moves the flapper 68 back to the center, which causes $P_{c1}$ and $P_{c2}$ to equalize. During a majority of operation, the input current command is held constant at a level that centers both the flapper 68 and the second stage valve 72. With the second stage valve 72 mechanically centered (as illustrated in FIG. 4), the $P_s$ and $P_b$ ports are closed off and there is no effective pressure differential ($P_{head}$–$P_{rod}$) to move the actuator 64. As a result, the actuator 64 is stationary. If the position command to the EHSV 66 were to change, the second stage would move and $P_{head}$ or $P_{rod}$ would go to $P_s$ and the other would go to $P_b$. $P_{head}$ would go through line 82 to the fail-fixed valve 60 via annulus 84 and then out to the head 86 via line 88. Similarly, $P_{rod}$ would go through line 90 to the fail-fixed valve via annulus 92 and out to the rod 94 via line 96. $P_{head}$ and $P_{rod}$ are used to move the actuator back and forth.

$P_{c1}$ and $P_{c2}$ also connect to the ends 98, 100 of the fail-fixed valve 60. If $P_{c1}$ and $P_{c2}$ are close to each other, little if any force is applied to the fail-fixed valve 60. The spring 102 on the fail-fixed valve will always drive the valve to the right during normal operation.

If the input current drive is lost (e.g., the input mA goes to zero), the EHSV 66 would shift (due to the preload torque built into the torsion spring 128) and the flapper 68 would drive to the right and slam against the right nozzle 104 (see FIG. 5). $P_{c2}$ would then increase towards $P_s$ and $P_{c1}$ would decrease towards $P_b$, just as with the fuel metering valve 34. As soon as that happens, the second stage valve would move rapidly to the left, which would provide a feedback torque to the flapper 68 via the spring 74 and tend to null the flapper 68 again. However, when the second stage valve 72 hits the stop 106, the second stage valve 72 is prevented from providing further feedback torque to the f lapper 68 and the feedback torque via the spring 74 becomes insufficient to pull the flapper off the right nozzle 104. The end result is that the second stage valve 72 will be all the way to the left stop and the flapper 68 will go all the way to the right. This results in $P_{head}$ being connected to $P_s$ and $P_{rod}$ being connected to $P_b$.

As long as the second stage valve 72 can move, it can provide feedback to the flapper 68 thus keeping the flapper 68 relatively centered and preventing $P_{c1}$–$P_{c2}$ from becoming very large. $P_{c1}$–$P_{c2}$ will never get larger than tens of psi in a typical application. When the second stage valve 72 can not move anymore (i.e., when it hits the stop), feedback to the flapper 68 is lost, the flapper 68 becomes uncentered and $P_{c1}$–$P_{c2}$ gets much larger. In other words, it is operating outside of its normal operating range. The large $P_{c1}$–$P_{c2}$ pressure differential will drive the fail-fixed valve 60 to the left until it hits stop 108.

When the second stage valve hits stop 106, there is essentially no pressure drop in the second stage valve 72. As a result, $P_{head}$ is essentially at $P_s$ and $P_{rod}$ is essentially at $P_b$. Before the fail-fixed valve 60 moved to the left, $P_{head}$ and $P_{rod}$ went through the fail-fixed valve 60 via annuluses 84, 92 and on to the head 86 and rod 94. Now line 82 is at $P_s$ and line 90 is at $P_b$. $P_s$ is connected to a single annulus 110 and $P_b$ is connected to a single annulus 112. The fail-fixed valve 60 now provides a four-way valve function. In other words, the supply and drain can be connected to either the head or the rod.

Figure 6:
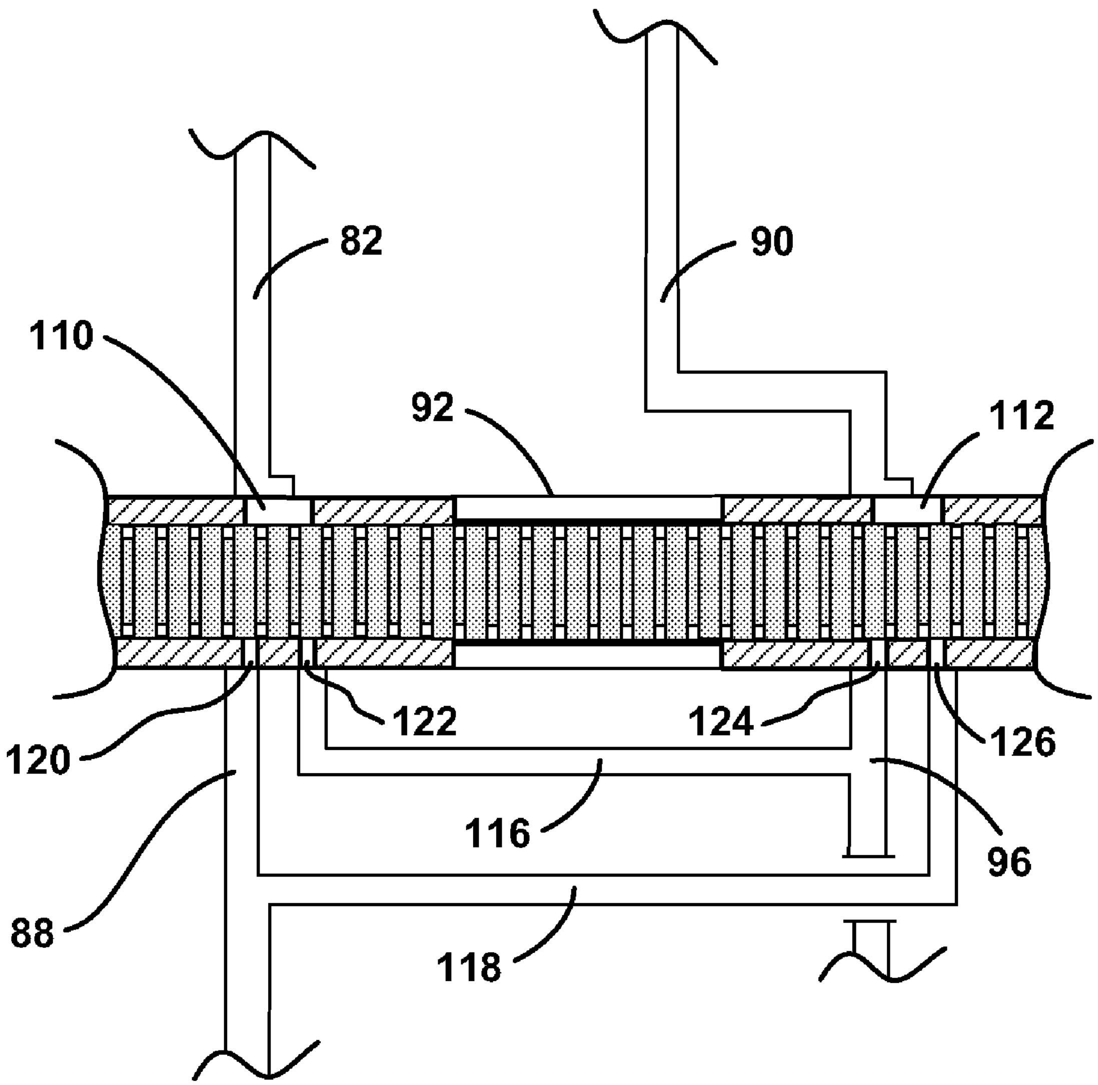
FIG. 6 is an enlarged partial view of the valve and actuator of FIG. 5 illustrating how the lands of the actuator rod interact with the ports of the valve.

Turning now to FIGS. 5 and 6, as the fail-fixed valve 60 starts moving to the left, the lines 82 and 90 become blocked. Once the head and rod lines 88, 96 are isolated, the driving force to move the actuator 64 has been stopped, but leakage will allow the actuator 64 to drift thus making it "spongy" in the presence of external forces. The fail-fixed valve 64 continues to move until it hits the stop. At this point, lines 82 and 90 are connected to annuluses 110, 112. Lines 82 and 90 now function as high and low pressure supply lines. The high and low pressure is supplied/drained to the actuator head 86 and rod 94 via the inlet annuluses 110, 112 and outlet annuluses 120, 122, 124, and 126 of the fail-fixed valve 60. The fail-fixed valve 60 provides four-way capability because the head can be connected to $P_s$ or $P_b$ and the rod can be connected to $P_b$ or $P_s$ depending on where lands 114 are located. Which lands 114 are used to control Phead and Prod depend on where the actuator was prior to when the fail-fixed valve 60 moved to the left. The position of the chosen lands relative to annuluses 120, 122, 124 and 126 depends on the position of the actuator after the fail-fixed valve 60 moves to the left. In this manner, an actuator position control system is created in which the reference position command is the same as the last commanded position of the EHSV 66 and the actuator's actual position is maintained at the reference position command via direct feed back of the actuator's position to the four-way control valve.

The annuluses 120, 122, 124, and 126 are blocked by one of the many little lands 114 on the "stem" of the actuator 64. If the actuator 64 were to move due to an external force, the $P_s$ (via annulus 110) would be either supplied to the head 86 via annulus 120 and line 88 or the rod 94 via annulus 122 and line 116. $P_b$ would be either supplied to the rod 94 via annulus 124 and line 96 or the head via annulus 124 and line 118 depending on the position of the lands 114 (i.e., depending on which annulus 120, 122, 124, 126 is opened and which is blocked by a land 114). Once the fail-fixed valve 60 hits the stop 108, and the four-way valve system becomes active, the high force gain of the four-way valve resists any further movement of the actuator 64.

To prevent movement of the actuator 64, corrective forces with a high gain (large change in force per unit of position error) are required. The high pressure gain of the four-way valve, in combination with the head 86 and rod 94 sense areas, provide the large force gain. The four-way valve function of the fail-fixed valve 60 provides high pressure gain via the annuluses 114 on the actuator's "stem" and the sleeve annuluses 110, 112, 120-126. While the pressure gain of the four-way valve is high, the relatively small size of the annuluses (120-126) restricts the flow gain capability (change in head and rod flow rate per unit of position error). Since flow gain defines the slew rate (inches per second) of the actuator 64, and the goal is to have a slew rate of 0, a restricted flow gain is acceptable.

When the fail-fixed valve 60 initially starts moving towards its stop 108, $P_s$ and $P_b$ are temporarily connected to $P_{head}$ and $P_{rod}$ while annuluses 84 and 92 are connected to lines 82, 88 and lines 90, 96 respectively until the fail-fixed valve 60 moves to block lines 82 and 90 from lines 88 and 96. As a result, there may be an initial shift in the position of the actuator 64. As long as the initial shift is within an acceptable percentage of the overall stroke of the actuator 64, the speed of the fail-fixed valve is deemed sufficiently fast. This initial shift is also a function of the resolution of the reference position command, which is defined by the width of the lands 114.

The resolution of the variable geometry system is limited. The lands 114 have a width and the width defines the size of the discrete increment in which the reference position command changes. The width of the lands are minimized so as minimize the size of this increment and thus minimize the inaccuracy between the fail-fixed position versus the last commanded position.

From the foregoing, it can be seen that once the input position command fails (i.e., current command goes to zero), the fail-fixed valve moves from its spring-loaded position to a position that stops the device from moving. The fail-fixed valve moves in response to the pressure differential of $P_{c1}-P_{c2}$ becoming very high due to the flapper of the EHSV moving against a nozzle. In a single stage EHSV application, the fail-fixed valve moves to a position such that the pressure differential across the device is equalized and a braking pressure is applied, thereby keeping the device at its last commanded position. In a two-stage EHSV application, the fail-fixed valve moves to a position such that the fail-fixed valve provides a four-way valve having high pressure gains with a reference position command that always matches the last commanded position of the EHSV, thereby keeping the device within a tolerance window of its last commanded position. The allowed tolerance window is dependent on the application. The provided tolerance is dependent on the number of stages in the EHSV, resulting speed of the fail-fixed valve, flow rates, sense areas, land width, etc. A single-stage EHSV will generally provide a smaller tolerance window than a two-stage EHSV.

As can be seen from the foregoing, a fail-fixed valve has been described that keeps a device controlled by an EHSV within a tolerance window of its last commanded position upon loss of input control command. The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fail-fixed valve for maintaining the position of a device controlled by an electrohydraulic servo-valve (EHSV) upon loss of an input position command, the device having a first control port and a second control port for moving the device, the EHSV having a first and second control pressure line for controlling the flow of a source pressure and a drain pressure to the first control port and the second control port to position the device, the valve comprising:

a first end in fluidic communication with the first control pressure line;

a second end in fluidic communication with the second control pressure line;

a first port in fluidic communication with, via a second port, the first control port of the device during normal operation of the electro-hydraulic servo-valve and one of the source pressure and the drain pressure for moving the device during normal operation, the fail-fixed valve adapted to move as a result of the pressure differential between the first and second ends created after the loss of the input position command to a position such that the first port is disconnected from the first control port and the device is kept within a tolerance window of a last commanded position;

a third port in fluidic communication with, via a fourth port, the second control port of the device during normal operation and wherein the second port is disconnected from the second control port after the loss of the input position command by movement of the fail-fixed valve; and a fifth port and a sixth port, the second port and the fifth port connecting the first control port to one of source pressure and drain pressure and the sixth port and the fourth port connecting the second control port to the other of source pressure and drain pressure after the first end initially hits a stop.

2. The fail-fixed valve of claim 1 wherein the device has a head and a rod; the rod having a plurality of lands, the first control port being in fluidic communication with the head and the second control port being in fluidic communication with the rod, and wherein one or more of the plurality of lands blocks the first port from being in fluidic communication with the second port and the sixth port and one or more other of the plurality of lands blocks the third port from being in fluidic communication with the fourth port and the fifth port after the first end hits the stop.

3. The fail-fixed valve of claim 1 wherein the fail-fixed valve is spring-loaded towards the second end.

4. A fail-fixed valve for maintaining the position of a device controlled by an electrohydraulic servo-valve (EHSV) upon loss of an input position command, the device having a first control port and a second control port for moving the device, the (EHSV) having a first and second control pressure for controlling the flow of a source pressure and a drain pressure to the first control port and the second control port to position the device, the valve comprising:

a first end in fluidic communication with the first control pressure line;

a second end in fluidic communication with the second control pressure line;

a first port in fluidic communication with, via a second port, the first control port of the device during normal operation of the electro-hydraulic servo-valve and one of the source pressure and the drain pressure for moving the device during normal operation, the fail-fixed valve adapted to move as a result of the pressure differential between the first and second ends created after the loss of the input position command to a position such that the first port is disconnected from the first control port and the device is kept within a tolerance window of a last commanded position; and a third port in fluidic communication with the second port, the third port blocked by the fail-fixed valve during normal operation of the electro-hydraulic servo-valve and wherein the third port is connected to the second control pressure line by movement of the fail-fixed valve after loss of the input position command, thereby causing the first control port and the second control port to be connected to the second control pressure line.

5. The fail-fixed valve of claim 4 wherein the device has a pressure seal, the fail-fixed valve further comprising a pressure seal port that is in fluidic communication with the pressure seal, the pressure seal port being connected to the first control pressure line by initial movement of the fail-fixed valve after loss of the input position command, the pressure of the first control pressure line creating a side-load on the device, thereby braking any movement of the device during the time it takes for the third port to be connected to the second control pressure line.

6. The fail-fixed valve of claim 5 wherein the fail-fixed valve further comprises an orifice between the first port and the second port.

7. A fail-fixed valve for maintaining the position of a valve spool upon loss of an input position command, the valve spool having a first control port and a second control port for moving the valve spool, the valve spool controlled by a single stage electro-hydraulic servo-valve (EHSV) having a first and second control pressure line for controlling the flow of a source pressure and a drain pressure to the first control port and the second control port to position the valve spool, the fail-fixed valve comprising:

a first end in fluidic communication with the first control pressure line;

a second end in fluidic communication with the second control pressure line;

a first port in fluidic communication, via a second port, with the first control port of the valve spool during normal operation of the electro-hydraulic servo-valve, the fail-fixed valve adapted to move as a result of the pressure differential between the first and second ends created after the loss of the input position command to a position such that the first port is disconnected from the first control port; and a third port in fluidic communication with the second port, the third port blocked by the fail-fixed valve during normal operation of the EHSV and wherein the third port is connected to the second control pressure line by movement of the fail-fixed valve after loss of the input position command, thereby causing the first control port and the second control port to be connected to the second control pressure line such that the valve spool is kept within a tolerance window of a last commanded position.

8. The fail-fixed valve of claim 7 wherein the valve spool has a pressure seal, the fail-fixed valve further comprising a pressure seal port that is in fluidic communication with the pressure seal, the pressure seal port being connected to pressure in the first control line by initial movement of the fail-fixed valve after loss of the input position command thereby creating a side-load on the valve spool, the side-load braking any movement of the valve spool during the time it takes for the third port to be connected to the second control pressure line.

9. The fail-fixed valve of claim 7 wherein the fail-fixed valve further comprises an orifice between the first port and the second port.

10. The fail-fixed valve of claim 7 wherein the fail-fixed valve is biased towards the second control pressure line.

11. The fail-fixed valve of claim 10 wherein the fail-fixed valve is biased towards the second control pressure line by a spring.

12. A fail-fixed valve for maintaining the position of an actuator controlled by a two stage electro-hydraulic servo-valve (EHSV) upon loss of an input position command, the actuator having a rod, a head, a control rod pressure line connected to the rod and a control head pressure line connected to the head, the control rod pressure line and the control head pressure line controlling movement of the actuator, the EHSV having a valve spool having a pressure head line and a pressure rod line for controlling the flow of a source pressure and a drain pressure to the control rod pressure line and the control head pressure line, the two stage electro-hydraulic servo-valve further having a first and second control pressure line for controlling movement of the valve spool, the fail-fixed valve comprising:

a first end in fluidic communication with the first control pressure line;

a second end in fluidic communication with the second control pressure line;

a first port connecting the control head pressure line, via a second port, to the pressure head line during normal operation of the EHSV, the fail-fixed valve adapted to move as a result of the pressure differential between the first and second ends created after the loss of the input position command to a position such that the first port is disconnected from the pressure head line;

a third port connecting the control rod pressure line, via a fourth port, to the pressure rod line during normal operation of the EHSV, wherein the third port is disconnected from the pressure rod line as a result of the fail-fixed valve moving as a result of the pressure differential between the first and second ends created after the loss of the input position command; and a fifth port and a sixth port, the second port and the fifth port connecting the control head pressure line to one of source pressure via the first port and drain pressure via the third port and the sixth port and the fourth port connecting the control rod pressure line to the other of source pressure via the first port and drain pressure via the third port after the first end initially hits a stop.

13. The fail-fixed valve of claim 12 further comprising a first pressure line connecting the sixth port to the control rod pressure line and a second pressure line connecting the fifth port to the control head pressure line.

14. The fail-fixed valve of claim 13 wherein a stem of the actuator has a plurality of lands and wherein one or more of the plurality of lands blocks the first port from being in fluidic communication with the second port and the sixth port and one or more other of the plurality of lands blocks the third port from being in fluidic communication with the fourth port and the fifth port after the first end hits the stop.

15. The fail-fixed valve of claim 14 wherein the fail-fixed valve further comprises a bore for receiving the stem.

16. The fail-fixed valve of claim 12 wherein the fail-fixed valve is spring-loaded towards the second end.

17. A fail-fixed valve for maintaining the position of an actuator controlled by a two stage electro-hydraulic servo-valve (EHSV) upon loss of an input position command, the actuator having a rod, a head, a control rod pressure line connected to the rod and a control head pressure line connected to the head, the control rod pressure line and the control head pressure line controlling movement of the actuator, the EHSV having a valve spool having a pressure head line and a pressure rod line for controlling the flow of a source pressure and a drain pressure to the control rod pressure line and the control head pressure line, the two stage electro-hydraulic servo-valve further having a first and second control pressure line for controlling movement of the valve spool the fail-fixed valve comprising:

a first end in fluidic communication with the first control pressure line;

a second end in fluidic communication with the second control pressure line;

a first port connecting the control head pressure line, via a second port, to the pressure head line during normal operation of the EHSV, the fail-fixed valve adapted to move as a result of the pressure differential between the first and second ends created after the loss of the input position command to a position such that the first port is disconnected from the pressure head line;

a third port connecting the control rod pressure line to the pressure rod line during normal operation of the EHSV, wherein the third port is disconnected from the pressure rod line as a result of the fail-fixed valve moving as a result of the pressure differential between the first and second ends created after the loss of the input position command; and wherein the pressure head line is connected to the source pressure after the loss of input position command and the pressure rod line is connected to the drain pressure after the loss of input position command.

* * * * *